Aug. 25, 1959 O. J. STODDARD 2,901,607
MULTISTAGE RING CIRCUIT
Filed June 8, 1955
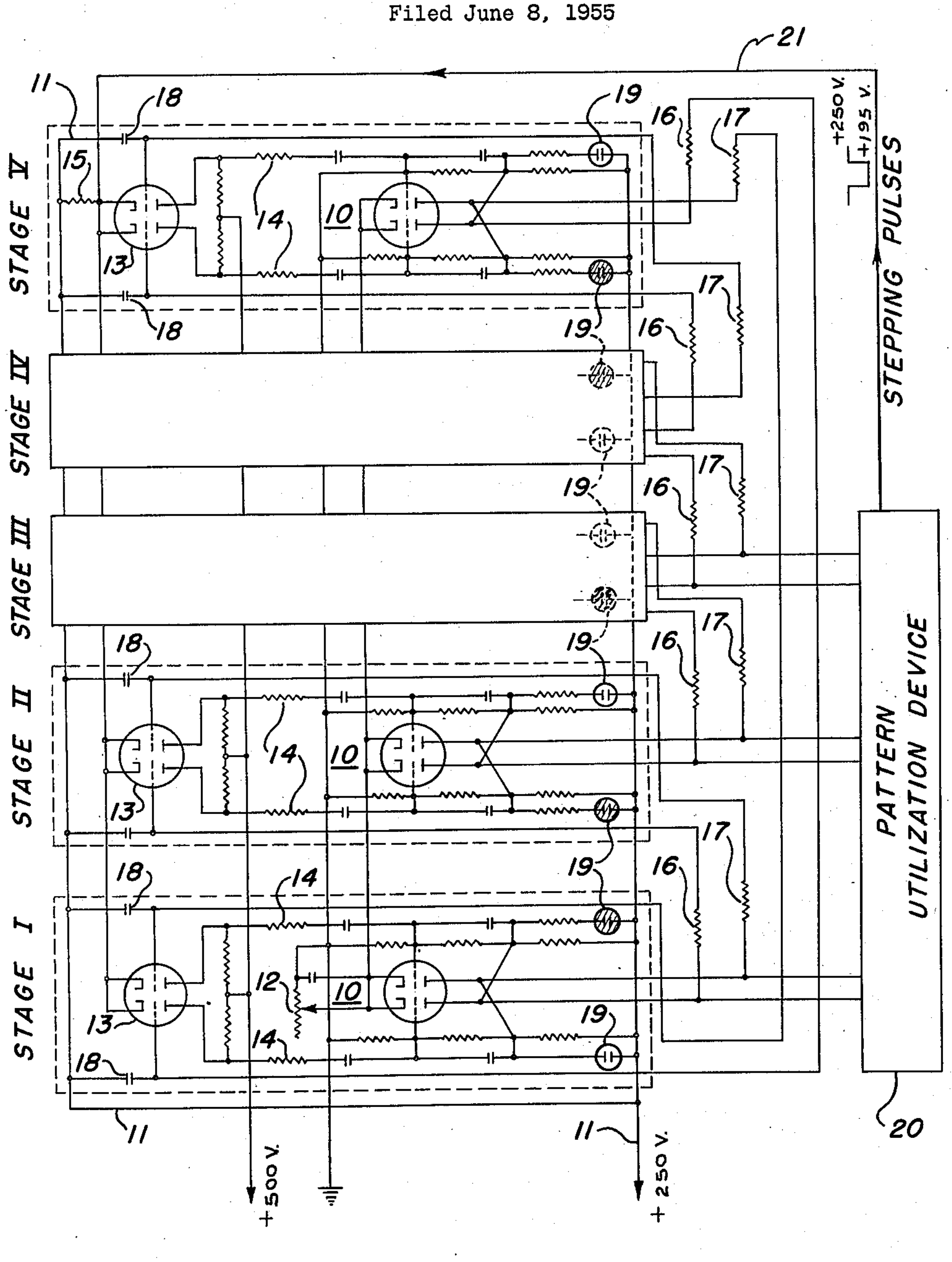
INVENTOR
ORREN J. STODDARD
BY George Sipkin
Rolla N. Carter
ATTORNEYS United States Patent Office 2,901,607

Patented Aug. 25, 1959

2,901,607

MULTISTAGE RING CIRCUIT

Orren J. Stoddard, Minneapolis, Minn., assignor to the United States of America as represented by the Secretary of the Navy Application June 8, 1955, Serial No. 514,133

2 Claims. (Cl. 250—27)

The present invention relates to ring circuits and more particularly to ring circuits capable of rotating a set-up pattern over a wide range of stepping pulse voltages and through a large number of stages.

Ring circuits belong to the general class of circuits which comprise a plurality of stages each capable of two different operating conditions inter-connected in such a way that a conductive condition can be stepped from stage to stage in response to input pulses. Each stage whether called a trigger unit, a multivibrator, a flip-flop, etc., is usually characterized by having two different stable operating conditions which generally take the form of two possible current paths only one of which conducts at a time, the current being transferred from one path to the other in response to certain electrical stimuli. When a plurality of such stages is arranged in tandem the resulting circuit is often known as an open ring or chain circuit and when the final stage is connected back to the first stage a ring circuit is obtained.

Ring circuits, both open and closed, have found many applications including, for example, their use in frequency dividers, distributors including complex gating, counters, pattern rings, and stepping storage devices. In a particular application, as a stepping storage device for a computer for example, an open ring circuit having one stage for each "word" of a number may be employed to shuttle numbers between a mnemonic device and a computer, the transfer between the memory and the storage being in sequence and between the computer and the storage in parallel. In another application a closed ring circuit is employed for rotating a set-up pattern, the entire pattern being advanced one stage by each stepping pulse.

Heretofore, in circuits of this type, the interconnections between the several stages have been relatively complex and required critical low-tolerance components. Even with expensive components, it has been considered impossible to provide sufficiently stable circuit components and adequate operating tolerances for reliable operation of a ring circuit having more than five stages.

The primary object of the present invention is to provide a ring circuit which may use standard tolerance components without reducing operating margins.

Another object of the invention is the provision of such a circuit in which each stage is primed solely by the immediately preceding stage.

Still another object of the invention is the provision of a ring circuit of greatly increased stability and whose number of stages is not limited as heretofore.

In accordance with the invention a plurality of flip-flop stages are connected together to form a chain or ring in such manner that the current through any one conducting stage is independent of the total number of stages and no pulse dodging is involved. To this end each flip-flop is provided with gating tubes through which it is coupled to the preceding flip-flop, the plates of the preceding flip-flop being connected through priming resistors to the grids of the gating tubes and the plates of the gating tubes being capacity coupled through isolating resistors to the grids of its flip-flop, the arrangement being such that the priming of a flip-flop is based solely on the preceding flip-flop.

Other objects and features of the invention will become apparent from the following description when read in connection with the accompanying drawing the single figure of which is a schematic circuit diagram of a pattern ring associated with a utilization device.

For the purpose of this disclosure a preferred form of the invention is illustrated as applied to a pattern ring abritrarily limited to five identical stages I to V each of which comprises a flip-flop or trigger unit 10 having right and left hand triode discharge elements the anodes and grids of which are cross-connected so that there are two stable conditions in which the right or the left hand triode is conducting and current conductivity is transferred from one side to the other in response to the application of a positive pulse to the grid of the nonconducting side or the application of a negative pulse to the grid of the conducting side. The anodes of the several triode elements are connected to a positive bus 11 through separate anode resistors and the cathodes are grounded through a common resistor 12.

Each trigger unit 10 is provided with a gating unit which may comprise a duo-triode tube 13 having the anodes of its right and left sections capacity-coupled through isolating resistors 14 to the grids of the right and left sides, respectively, of its associated trigger unit 10. The negative side of the power supply for the gating units tubes 13 is the bus 11 comprising the positive side of the plate supply for the trigger units 10. The cathodes of the gating tubes 13 are connected together and through a common cathode resistor 15 to the bus 11. The grid in the left side of each gate tube 13 is connected to the left anode of the trigger unit 10 in the preceding stage through a separate resistor 16 which performs a priming function for the gate elements. The right grid of each gate tube 13 is similarly connected through a separate priming resistor 17 to the right anode of the trigger unit 10 in the preceding stage and all of the grids of the gate tubes 13 are connected to individual capacitors 18 whose other sides are connected to the bus 11. Indicating means 19, which may be neon lamps, connected in the anode circuits of the trigger tubes 10 are convenient for showing which side is conducting.

A pattern set up in the ring is rotated through the several stages by stepping pulses applied to all of the stages simultaneously in the form of negative pulses fed across the common cathode-bias resistor 15 for all of the gating tubes 13 and hence are equivalent to the application of positive pulses to all of the grids of the gating tubes 13.

From the above it will be seen that the control grids of each of the gating tubes 13 is held at a direct current potential contributed by the corresponding anode of the trigger unit tube 10 in the preceding stage, e.g., the left grid in the gate 13 of stage II has the potential of the left anode in the tube 10 of stage I, etc. This potential which is also applied to the associated hold-over capacitor 18 is fixed at a value depending upon the conducting condition of the flip-flop unit 10, as here illustrated this value being +130 volts when there is anode current and +225 volts in the absence of anode current. The low potential of 130 volts on the grid of a gate tube 13 is far below cut-off and a stepping pulse of −55 volts applied to its associated cathode will have no effect whereas, when a gate-grid is at a high potential of 225 volts the gate is primed to just below cut-off so that a stepping pulse is amplified and applied as a negative pulse to the grid of the corresponding side of the associated trigger unit 10 which if conducting will be cut off and if not conducting will remain so.

In describing operation, it is assumed that before the first stepping pulse is applied the set-up condition or pattern in the five stages is such that they are conducting in the left, right, right, left, and right sections, respectively, as indicated by shading of the neon lamps 19. Under these conditions the left and right flip-flop anodes in stage I prime the left and right gate-grids in stage II to far below cut-off and just below cut-off, respectively, with the result that a stepping pulse applied to the gate cathodes in stage II has no effect on the left gate section but is amplified by the right gate section and applied to the right flip-flop grid in stage II as a negative pulse which functions to transfer current from the right to the left section of the stage II flip-flop unit 10, thereby effectively stepping the flip-flop condition of stage I to stage II.

Similarly, the left flip-flop anode in stage II primed the left gate-grid in stage III to just below cut-off so that when the stepping pulse was applied to stage III it was amplified by the left gate section and applied to the left flip-flop section in stage III as a negative pulse but, since this section was already non-conducting, nothing happened and the right flop-flop section in stage III remained conducting which was the condition in stage II and thus the condition in stage II has effectively been stepped to the flip-flop unit in stage III. This process takes place simultaneously between all the stages around the ring so that the pattern set up in the ring is rotated around the ring one stage for each stepping pulse applied across the cathode-bias resistor 15 common to all of the gating tubes 13.

As long as stepping pulses are applied across the common resistor 15 the pattern is stepped around the ring as indicated by the following tabulation:

| Pulse No. | Flip-flop stage and side drawing current | | | | |
|---|---|---|---|---|---|
| | I | II | III | IV | V |
| Standby | L | R | R | L | R |
| 1 | R | L | R | R | L |
| 2 | L | R | L | R | R |
| 3 | R | L | R | L | R |
| 4 | R | R | L | R | L |
| 5 | L | R | R | L | R |

Proper operation of the flip-flop in stepping the pattern is insured by the ability of the capacitors 18 in the priming circuits to hold over their charge until after the period of the stepping pulse. During the interval between pulses, the hold-over capacitors 18 are individually charged to particular voltages determined by the condition of their associated flip-flop anodes. As the pattern begins to shift upon the application of a stepping pulse, the charge on each hold-over capacitor 18 should remain essentially unchanged until after the period of the stepping pulse because a too rapid change in the charge will remove its effect too soon and result in a probable incorrect flip while too slow a change may carry its effect over to a succeeding pulse to produce an incorrect flip. Thus the value of the capacitors 18 must be properly chosen so as to remember the condition of the previous stage only long enough to outlast the stepping pulse.

The desired pattern may be set up in the ring in any suitable manner and if the pattern is intended to be a permanent one, such as might be employed in a register for controlling an iterative process in a computer, the respective flip-flops can be provided with bias which favors the state desired for the set-up pattern.

The pattern ring of the invention is indifferent to the use made of its rotated pattern and to the number of stages employed. As indicated in the drawing, a utilization device 20 may be provided for supplying stepping pulses over a lead 21 to the bias resistor 15 shared by the cathodes of the gate tubes 13 and for taking off signal information from certain stages, for instance stages I, II and III, as may be required by its programming. The signal information contained in the rotating pattern may conveniently be extracted from the anodes of the flip-flop tubes 10 in these three stages and coupled to the utilization device 20 with very little loading of the flip-flop tubes 10, as by cathode followers.

It will be evident from the foregoing that the pattern ring of the present invention has great stability which permits considerable variations in component values and tube characteristics without causing random flipping or flopping of the individual flip-flop stages. It is to be understood that the several voltage values given in the drawing are merely indicative of suitable operating values and not limiting.

While for the purpose of explaining the invention a single embodiment has been described, it will be obvious to those skilled in the art that the novel features may be incorporated in a variety of embodiments without departing from the scope of the invention defined in the appended claims.

Having thus described the invention, what is claimed is:

1. A multistage ring circuit comprising a plurality of trigger units each having right and left electron discharge elements, including cathodes, control electrodes, anodes and a voltage supply therefor, and individual output terminals connected directly to the anodes for providing output potentials having different values in accordance with whether the right or left side discharge element is conducting, right and left triode gate tubes associated, respectively, with the right and left discharge elements in each of the trigger units, a coupling capacitor and an isolating resistor connected in series individually between the anodes of the gate tubes and the control electrodes of the associated trigger units, means for applying the right and left output anode potentials of each trigger unit as control potentials, respectively, for the right and left gate tubes associated with the next succeeding trigger unit, a bias resistor common to and connecting all of the cathodes of said gate tubes to the positive side of said anode supply, a hold-over capacitor connected in charging relation between each of said control potentials and the positive side of said anode supply, and means for applying across said bias resistor a stepping pulse such that it is passed by each gate tubing having a control potential derived from a trigger unit discharge element which is not conducting and drives below cut-off the trigger unit discharge elements associated with such gate tubes, whereby in response to each stepping pulse the conducting condition of each trigger unit is transferred to the next succeeding trigger unit.

2. A pattern ring circuit comprising a plurality of stages coupled together to form a closed loop, each stage comprising two triode gate tubes having individual biasing circuits including a capacitor, a trigger unit including two tubes each having a cathode, control grid, and anode, and respectively controlled by said gate tubes, characterized by the coupling between each two adjacent stages being a pair of priming resistances connected respectively directly between the trigger unit anodes in one stage and said capacitors in the next succeeding stage, a coupling capacitor and an isolating resistor connected in series individually between the gate tube anodes and the control grids of the trigger unit in each stage, and by the gate triodes sharing a common cathode resistor so that upon the application of a negative stepping pulse across said cathode resistor every gate tube whose biasing capacitor is charged from a non-conducting trigger unit anode conducts to drive its associated trigger unit tube to cut-off, whereby a set-up pattern in the ring is rotated one stage each time a stepping pulse is applied.

References Cited in the file of this patent

UNITED STATES PATENTS

| | | |
|---|---|---|
| 2,306,386 | Hollywood | Dec. 29, 1942 |
| 2,540,024 | Bergfors | Jan. 30, 1951 |
| 2,540,442 | Grosdoff | Feb. 6, 1951 |
| 2,580,771 | Harper | Jan. 1, 1952 |
| 2,601,089 | Burkhart | June 17, 1952 |
| 2,649,502 | Odell | Aug. 18, 1953 |
| 2,724,553 | Faulkner | Nov. 22, 1955 |
| 2,765,403 | Loper et al. | Oct. 2, 1956 |